March 13, 1951 R. S. MARK ET AL 2,544,848
FACTOR ENTERING MECHANISM
Filed Dec. 5, 1949 4 Sheets-Sheet 2

INVENTORS
RICHARD S. MARK
FRED N. SCHWEND
BY CLIFFORD P. STOWELL
ATTORNEY

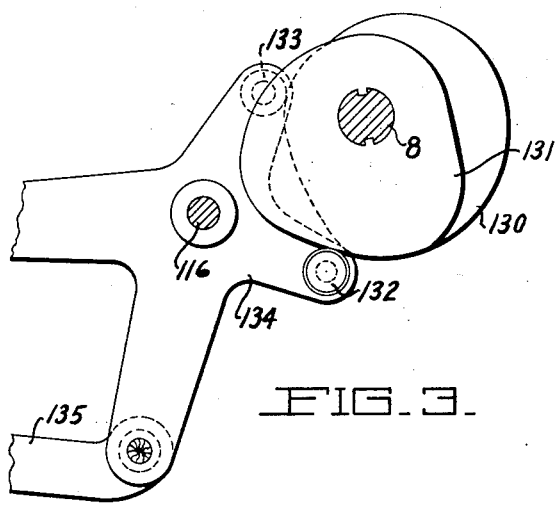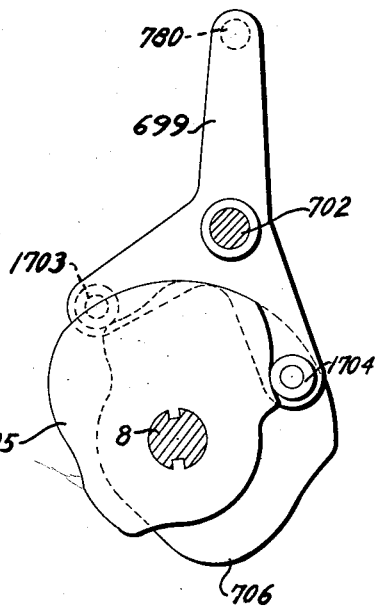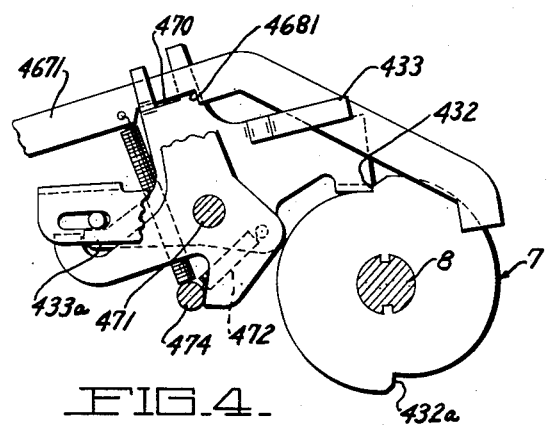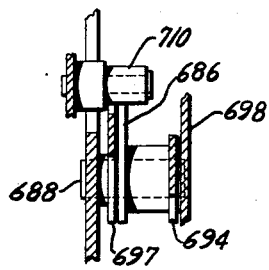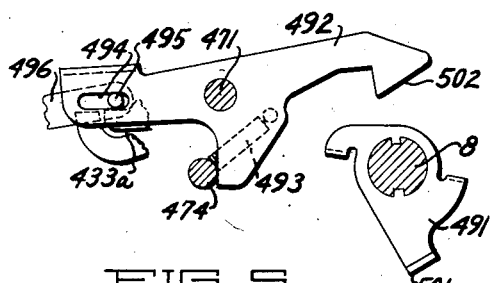

March 13, 1951  R. S. MARK ET AL  2,544,848
FACTOR ENTERING MECHANISM
Filed Dec. 5, 1949  4 Sheets-Sheet 4
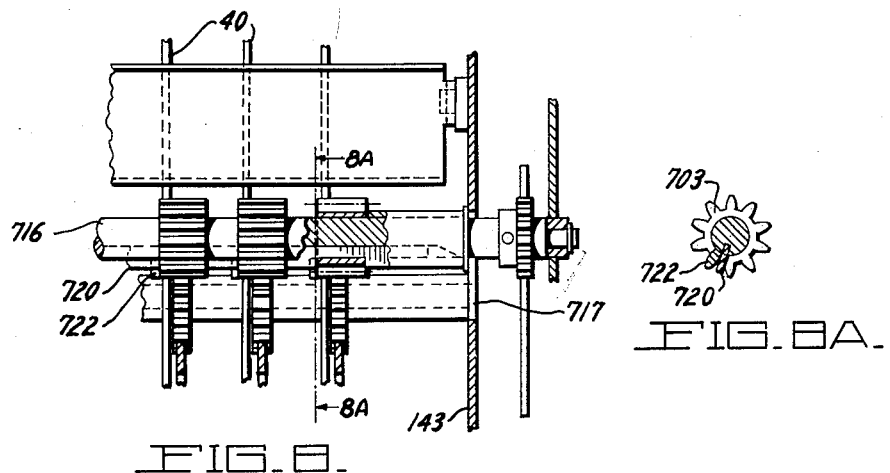
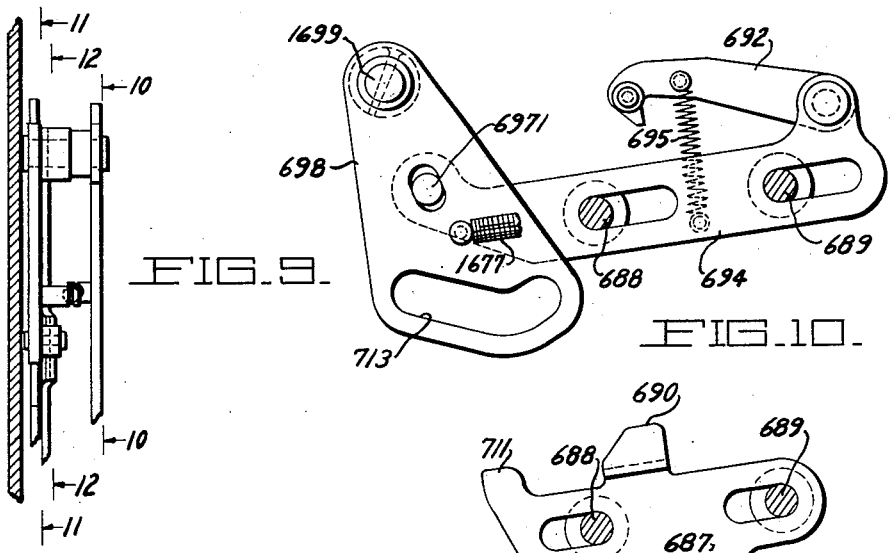
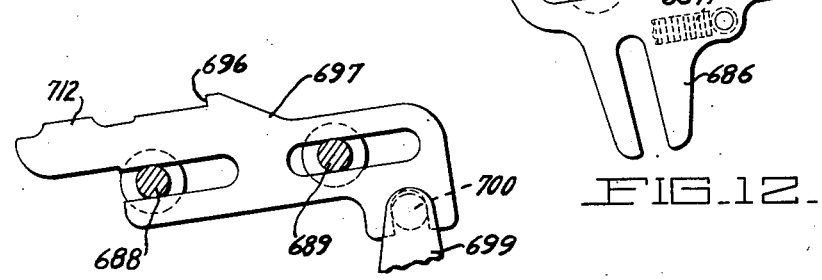
INVENTORS.
RICHARD S. MARK
FRED N. SCHWEND
CLIFFORD P. STOWELL
BY
ATTORNEY

UNITED STATES PATENT OFFICE 2,544,848

FACTOR ENTERING MECHANISM

Richard S. Mark, Arcadia, Fred N. Schwend, Monterey Park, and Clifford P. Stowell, Alhambra, Calif., assignors to Clary Multiplier Corporation, San Gabriel, Calif., a corporation of California Application December 5, 1949, Serial No. 131,113

2 Claims. (Cl. 235—61)

This invention relates to calculating machines and has particular reference to calculating machines of a type useful in calculating problems involving repetitively used factors or constants.

In multiplication calculations, for example, it is often desirable to use a constant multiplying factor in performing a series of successive problems. As an example, in tax computations where it is desired to obtain the tax values of different property values based on a constant tax rate or percentage assessment, the various property values are successively multiplied by the same tax rate.

In simpler forms of multiplying calculators, a constant multiplier factor must be entered into a special multiplier keyboard, or at the proper time in a single common keyboard, pursuant to each calculation. In other multiplying calculators, provision is made for retaining a constant multiplier factor in the machine without having to set it up for each successive calculation, but in all such calculators of which we are aware, the constant is first entered into an appropriate keyboard, or into a single common keyboard at the appropriate time, and thereafter, or before, a special constant retaining control key or element is set, thereby effecting retention of the constant factor in the machine as long as desired throughout a series of successive problems. When it is desired to enter a new constant factor, the constant control key or element is unset or a separate key is manipulated in order to clear the previous constant out of the machine as an incident to the entering of a new constant. Such a control device is disclosed and claimed in the copending application of E. P. Drake, Serial No. 108,843 filed August 5, 1949, and since matured into Patent No. 2,515,442, issued on July 18, 1950.

Although such previous constant control devices are generally satisfactory, they require setting or depressing special control keys in order to retain the constant factor, thus imposing an extra burden on the part of the operator in remembering the proper manipulation and sequence of manipulations of various necessary controls. Also, the foregoing calculators require the constant to be set up and the constant setting key or controls to be set before the first calculation is consummated. However, it often occurs that one does not know beforehand whether a multiplier factor being used in one multiplication problem is to be used as a constant for a succeeding problem or problems. For example, the factors of different subsequent multiplication calculations may be on separate bills or pages arranged in a stack, one above the other, so that the machine operator is not aware of the factors of a succeeding problem until the preceding problem has been completed.

It therefore becomes the principal object of the present invention to provide an improved constant factor retaining device for a calculating machine.

Another object of the present invention is to provide a constant factor retaining device which is automatic in operation and which does not require pre-setting of any controls in order to effect constant factor operations.

Another object is to clear an old factor from a calculating unit in one portion of a machine cycle and to enter a new factor in the calculating unit at a later time in the same cycle.

A further object is to reduce the number of keys or other setting and control devices necessary to effect entry of either constant factors or factors which are to be used only once for each calculation.

The manner in which the above and other objects of the invention are accomplished will be readily understood on reference to the following specification when read in conjunction with the accompanying drawings, wherein:

Fig. 3 is a side view showing the cam drive for driving the main racks.

Fig. 4 is a side view showing the controls for the cyclic drive clutch.

Fig. 5 is a side view illustrating further controls for the cyclic drive clutch.

Fig. 6 is a detailed side elevation of the cam drive for operating the multiplicand entry controls.

Fig. 7 is a transverse sectional view taken along the line 7—7 of Fig. 2.

Fig. 8 is a front view, partly in section, showing the mechanism for coupling the main racks to the multiplicand racks for entering factors into the latter.

Fig. 8A is a transverse sectional view taken along line 8A—8A of Fig. 8.

Fig. 9 is a sectional plan view showing part of the multiplicand entering controls.

Figs. 10 to 12, inclusive, are detailed side elevational views taken substantially along the lines 10—10 to 12—12, respectively, in Fig. 9.

Fig. 13 is a timing chart showing the functions of different elements of the machine.

The mechanism of the present invention is intended to be embodied in a calculating machine similar to that disclosed and claimed in the copending application of R. E. Boyden et al., Serial No. 710,880 filed November 6, 1946, and since matured into Patent No. 2,515,692 issued on July 18, 1950. Accordingly, reference is hereby made to said application for a complete disclosure of a calculating machine to which the present invention may be applied. Therefore, for the sake of brevity, only that mechanism which embodies the present invention and that which directly cooperates therewith will be described herein in detail. It should be understood, however, that the invention may be equally well embodied in other forms of calculating machines and may be used in connection with mechanisms for performing problems other than multiplication, such as division.

Figure 1:
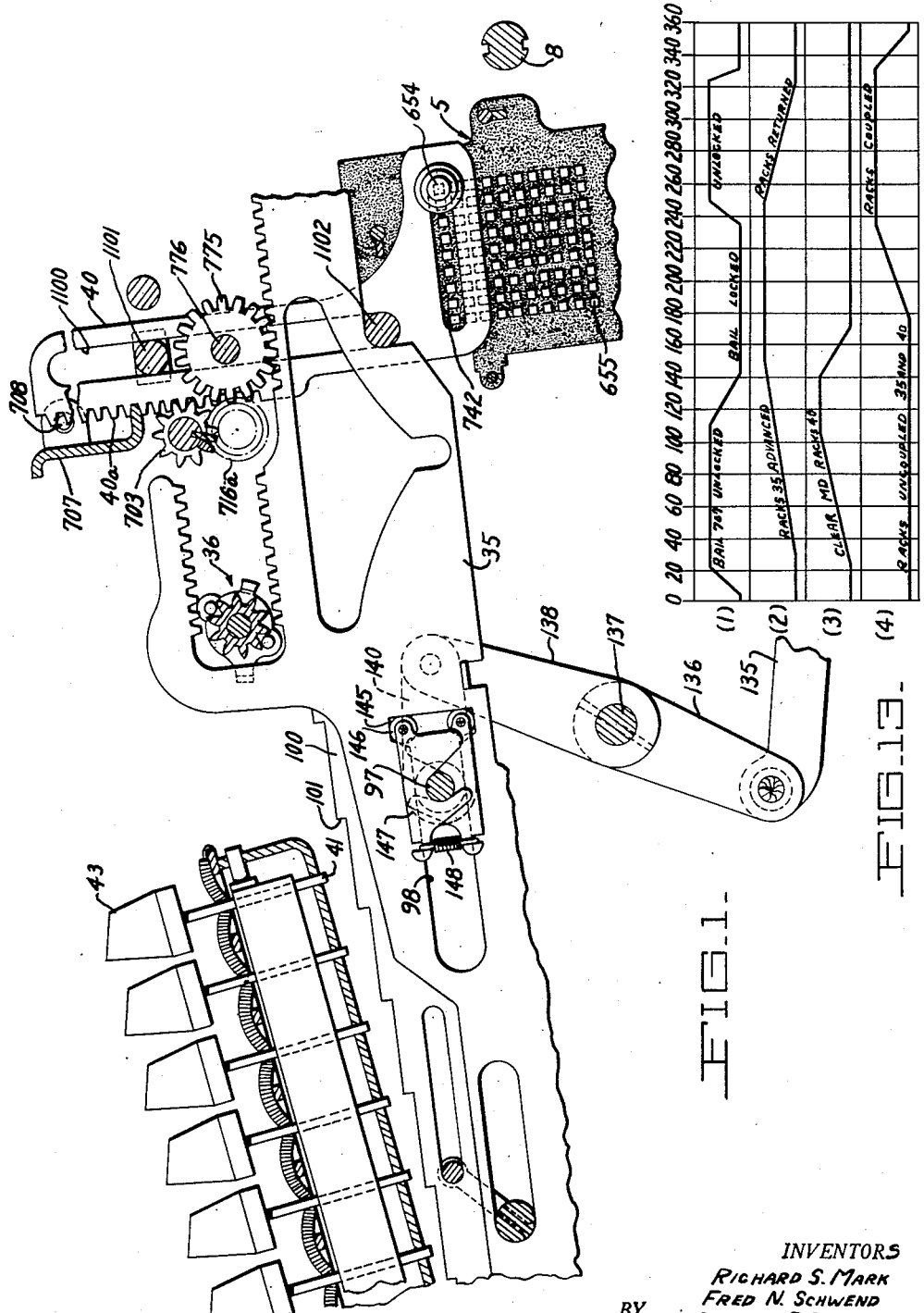
Fig. 1 is a longitudinal sectional view through part of a machine embodying a preferred form of the present invention.

The present machine is of the reciprocating rack type comprising a plurality of ordinally spaced differentially operable racks, one of which is shown at 35 (Fig. 1). Each rack is supported for fore and aft movement at the rear thereof by suitable guide means (not shown). At its forward end, each rack 35 is supported by a laterally shiftable rack drive shaft 97 suitably guided in a manner not shown for movement fore and aft of the machine. The shaft 97 extends through and is movable along slots 98 formed in the various racks.

For the purpose of differentially controlling the extent of differential movement of the racks during entry of items into the machine, there is provided in operative relation to each rack a series of keys, some of which are shown at 43, ranging in value from "one" to "nine" and forming part of the keyboard of the machine. Each key 43 is depressible into a set position wherein a key stem 41 thereof is positioned to be engaged by a shoulder 101 of a rack stop bar 100. For the purpose of the present disclosure each rack stop bar may be considered as relatively immovable with respect to its associated rack.

The various shoulders 101 are spaced from their respective key stems 41 by increments corresponding in number to the values of the different keys whereby to control movement of the racks by amounts proportional to the values of the depressed keys.

The racks 35 are utilized to transfer mechanical representations of values between different operating units of the machine, such as the aforementioned keyboard, an accumulator generally indicated at 36, multiplying mechanism generally indicated in part at 5, etc.

Drive

Power for operating the various mechanisms of the machine is obtained through a cyclically operable clutch 7 (Fig. 4), the clutch being controlled by depressible control bars, one of which will be described in detail later. Upon engagement of the clutch 7, the latter is effective to rotate a main shaft 8 upon which it is mounted, the latter carrying thereon various operating cams.

Means are provided for yieldably transmitting a drive from the main shaft 8 to the various racks 35 to differentially advance the same under control of the amount keys 43 and to positively return the racks to their home or starting positions illustrated in Fig. 1.

Referring to Fig. 3, a pair of complementary rack drive cams 130 and 131 are keyed on the aforementioned shaft 8 and are engaged by rollers 132 and 133 of a cam follower 134. The latter is pivoted at 116 and is connected by a link 135 (see also Fig. 1) to an arm 136. This arm is fixed on a rockable shaft 137 to which are secured spaced arms 138 connected by links 140 to the aforementioned rack drive shaft 97 so as to reciprocate this shaft once during each cycle of the clutch 7.

The slot 98 in each of the drive racks 35 terminates at its rear in laterally opposed notches 145. Opposed carriers 147 are pivoted on the shaft 97 adjacent the racks 35 and are provided with rollers 146 normally engaging the notches 145. The two carriers 147 associated with any one rack are spring urged in opposite directions by a tension spring 148 to thereby yieldably maintain the rollers 146, in driving, in engagement with the notches 145, thus forming a yieldable connection between the shaft 97 and each of the different racks 35. The foregoing yieldable rack drive mechanism is disclosed and claimed in the copending application of R. E. Boyden, Serial No. 718,706, filed December 27, 1946, now Patent No. 2,490,200.

Multiplying mechanism

As disclosed in detail in the aforementioned Boyden et al. application, Serial No. 710,880, multiplication is accomplished in the machine for which the present invention is intended to be embodied, by sequentially multiplying all digits of the multiplicand by each digit of the multiplier. This is accomplihsed by coordinately adjusting ordinally arranged contact elements 654 (Fig. 1) in two directions with respect to coordinately arranged terminal contacts 655.

The latter contacts are connected in different circuits arranged in a pattern in which the circuits are related to each other in accordance with the values of the partial products of the multiplication tables.

These circuits control differential actuating mechanism (not shown) which is operatively associated with a suitable accumulator (also not shown) arranged to receive and accumulate the sub-products of multiplication obtained by different multiplier digits.

Figure 2:
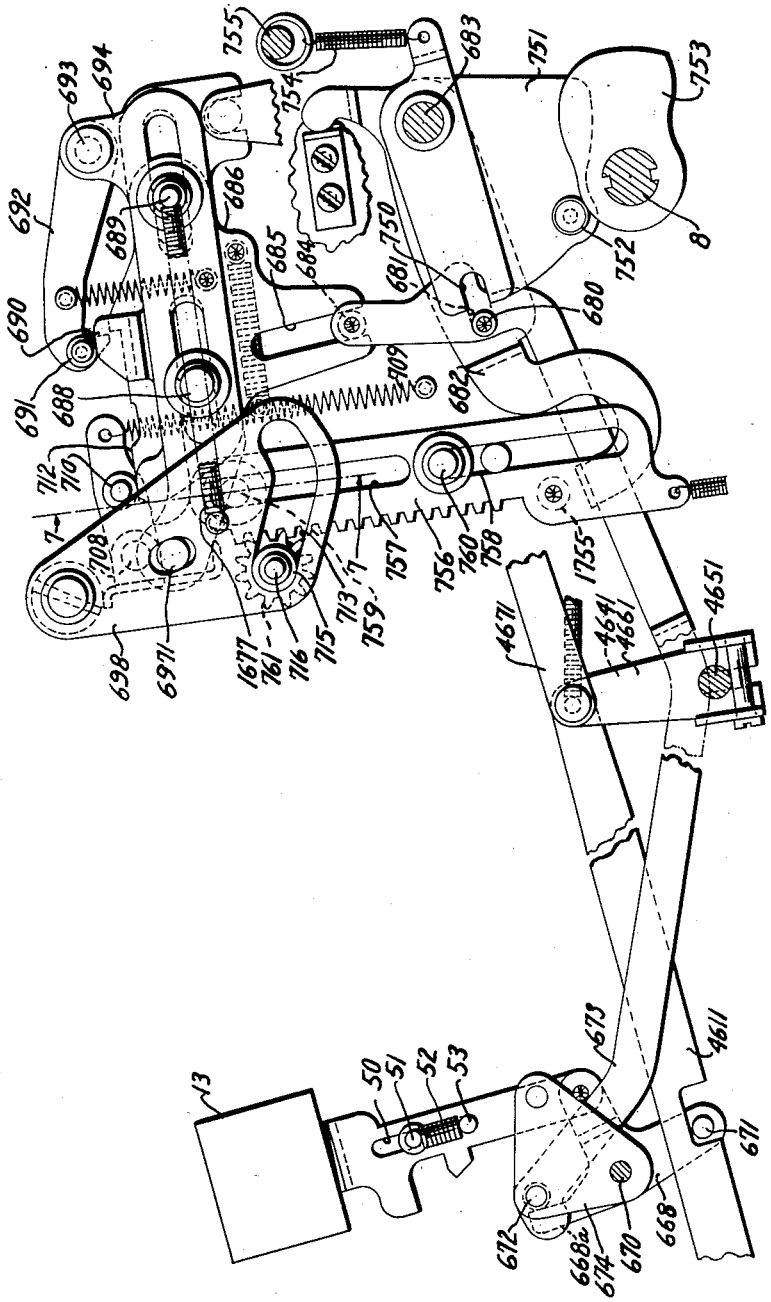
Fig. 2 is a side elevation showing devices for controlling the mechanism for entering and clearing multiplicand factors in and from the machine.

Generally speaking, the multiplicand is entered into the machine by setting the same into the keyboard and depressing a multiplicand or first factor bar 13 (Fig. 2). The latter causes operation of the machine to vertically position the different contact elements 654 by amounts corresponding to the values of the different digits entered in the associated orders of the keyboard. The contact elements, having been vertically adjusted in alignment with selected horizontal rows of contacts 655, are thereafter retained in alignment with such rows, and thereafter, the multiplier is entered into the keyboard in the same manner as was the multiplicand factor and controls (not shown) are set into operation to concurrently move all of the contact elements 654 fore or aft along their now associated horizontal rows of contacts and into alignment with vertical rows of such contacts corresponding to the first selected digit or lower order denominational digit of the multiplier factor. After multiplication in accordance with the first order denominational multiplier digit, all contact elements 654 are shifted fore or aft into alignment with another vertical row of terminal contacts 655 corresponding to the second order denomination multiplier factor so as to, in effect, multiply by that multiplier digit, and so on, until multiplication by all multiplier digits is completed. During the entire multiplication operation, however, the contact elements 654 are retained in alignment with their previously selected horizontal row of contacts 655.

*Multiplicand entering means*

It is important to note at this time that the contact elements 654 normally remain in vertically set positions during and after a multiplication operation, and in fact remain in their previously set vertical positions as long as the bar 13 is not depressed. Thus the multiplicand factor will remain in the machine as a constant for any number of succeeding problems if desired. Accordingly, setting of a new multiplier factor into the machine and operation of the necessary controls to effect multiplication will merely cause the contact elements 654 to move fore and aft to selected multiplier digit positions while remaining in their previously set vertical or multiplicand factor settings. When, and only when, the multiplicand factor is to be changed in value for a new problem need a new multiplicand factor be set up on the keyboard and entered into the machine by actuation of the bar 13. At such time, the old multiplicand factor will first be cleared by moving all contact elements 654 upward into alignment with the upper horizontal row or "0" horizontal row of contact 655, if they are not already so positioned, and thereafter such contacts will be moved downwardly to different vertical positions representing the new multiplicand factor.

The stem of the control bar 13 is provided with a vertical slot 50 guided over a stationary frame stud 51 and the bar is normally held in a raised position by a spring 52 tensioned between a stud 53 on a stem and the stud 51. Depression of the bar 13 rocks a bell crank 668 about its pivot 670 to carry a pin 671 on the lower end thereof against one edge of a notch in a clutch control bar 4611. The latter is suitably guided for lengthwise movement at the forward end thereof in a manner not shown and is pivotally connected at its rearmost end to an arm 4641. The latter is fastened on a rockable shaft 4651 to which is also fastened a second arm 4661 connected to the forward end of a clutch control bar 4671 (see also Fig. 4). This link is provided with a notch 4681 normally embracing an ear 470 on a main clutch control lever 433. The control lever 433 is pivoted at 471 and is urged clockwise by a spring 472, extending between the clutch control lever and a stationary stud 474 to normally hold the lever in engagement with a full cycle shoulder 432 formed on the main clutch 7, in which position the clutch control lever is effective to hold the clutch in disengaged condition. Thus, upon depression of the multiplicand bar 13, the clutch control lever 433 will be rocked counter-clockwise to cause engagement of the main clutch 7.

It will be noted that there are two arresting shoulders 432 and 432a formed on the clutch 7, diametrically opposite each other, and each capable of being engaged by the clutch control lever 433 to arrest operation of the clutch. However, during multiplicand clearing and entry operations, means are provided for preventing the shoulder 432a from being arrested by the clutch control lever 433, thus insuring the complete rotation of the shaft 8 during a machine cycle pursuant to multiplicand entry operation. For this purpose, a camming lever 492 is also pivoted at 471, independently of the clutch lever 433. The camming lever is normally held in its illustrated position against the stud 474 by a spring 493.

A slot 494 is formed in the lever 492 to carry a pin 495 which is settable by means of a link 496 into either of two positions therealong. However, for the purpose of the present disclosure the pin 495 can be considered as normally held as in its illustrated rearmost position in the slot.

Toward the mid cycle of the clutch 7, a camming lever 491 keyed on the main shaft 8 carries an ear 501 thereon against a camming edge 502 on the lever 492, rocking the latter counter-clockwise to force the pin 495 to engage a tail 433a of the clutch control lever 433 and thus retains the control lever in a counter-clockwise rocked position until the arresting shoulder 432a passes below the control lever. Therefore, the clutch will continue through the second half of its cycle and at the end of that time the control lever 433 will, under the action of its spring 472, engage the full cycle shoulder 432 of the clutch to disengage the same.

Describing now the means whereby depression of the bar 13 causes transmission of movement from the main racks 35 to their respective contact elements 654 to position the latter vertically in accordance with the value of the different digits of he multiplicand factor, the bell crank 668 (Fig. 2) is provided with a tail 668a which is effective to actuate a pin 672 pivotally connecting the fore end of a link 673 to an arm 674 which is pivotally supported at 670 independent of bell crank 668. The link 673 carries a stud 680 extending from opposite sides thereof and guided in an elongated slot 681 formed in a lever 682 which is pivotally mounted on a stationary shaft 683. A second stud 684 is carried by the link 673 and rides in a vertical slot 685 of a control slide 686 (see also Fig. 12). The latter is provided with elongated slots guided over stationary guide pin 688 and 689.

The control slide is normally held in its forward illustrated position by a spring 687 extending between the slide and a suitable portion of the frame, and in such position a cam lobe 690 thereon upholds a roller 691 (see also Fig. 10) mounted on a hook 692. The latter is pivoted at 693 to an actuating slide 694. The latter slide is also provided with elongated slots guided over the pins 688 and 689 and a spring 695 is tensioned between the slide and the hook 692 to urge the latter downward. Thus, when the control slide 686 is moved rearwardly upon depression of the control bar 13, the cam lobe 690 allows the hook 692 to drop into position in front of a shoulder 696 of a third power actuated slide 697 (see also Fig. 11).

Slide 697 is provided with elongated slots also guided over the guide pin 688 and 689. This slide is reciprocated in a peculiar manner once during each clutch cycle, and for this purpose it is connected through a pin slot connection 700 to a cam follower 699 (see also Fig. 6). The latter is pivoted on a frame stud 702 and is provided with rollers 1703 and 1704 engaging the peripheries of complementary cams 705 and 706, respectively, keyed on the clutch shaft 8.

The power actuated slide 697 and the control slide 686 conjointly control a locking means for locking the various control elements in their vertically set positions.

Referring to Fig. 1, each contact element 654 is guided in a horizontally extending slot 742 formed in a vertically movable auxiliary or multiplicand rack 40. The latter has a guide slot 1100 therein slidable over guide rods 1101 and 1102 and is provided with a rack gear section continuously in mesh with an associated gear 703 to be described further hereinafter.

A rack lock bail 707 is pivotally supported on trunnion bearings 708 (Figs. 1 and 2) and is normally urged clockwise towards a disengaging position relative to the racks 40 by a spring 709. A roller 710 is carried by the locking bail and normally rests on cam formations 711 and 712 formed on the slides 686 and 697, respectively, which formations normally conjointly maintain the locking bail in locking engagement with all of the racks 40. Rearward movement of slide 686 upon depression of the control bar 13 will remove the cam formation 711 from under the roller 710, leaving the same to be held solely by the slide 697. Thereafter, as the power driven slide 697 is moved fore and aft of its position shown in Figs. 2 and 11 in a manner to be described presently, the roller 710 will be allowed to drop off the cam formation 712 from time to time to permit the spring 709 to release the locking bail 707 so that racks 40 may be vertically adjusted.

Describing now the means for raising and lowering the racks 40 and consequently the contact elements 654, the slide 694 is connected through a pin and slot connection 6971 (Figs. 2 and 10) to a rockable cam plate 698. The latter is fastened to a rockable support shaft 1699 connected to a similar plate (not shown) on the opposite side of the machine. These cam plates and slide 694 are normally held in their rearward illustrated positions by a spring 1677 connected between the guide stud 689 and a stud on the cam plate.

Each of the cam plates (698) has a cam slot 713 formed therein embracing a roller 715 mounted on the adjacent end of a shaft 716 (see Figs. 1, 2 and 8). The latter is guided at opposite ends thereof for vertical movements in vertical slots 717 carried in stationary machine side frames, one of which is shown at 143. The shaft 716 rotatably supports the aforementioned gears 703 (Figs. 1 and 8) for rotation independently of the shaft and of each other.

Referring in particular to Fig. 8, the shaft 716 is provided with a long key 720 fitted into a longitudinally extending key way therein. This key has ordinally spaced drive sections connected by intermediate sections, the latter of which have their outer edges extending coextensive with the periphery of the shaft 716. The various gears 703 are mounted over the intermediate sections and are thus guided against longitudinal movement on the shaft 716 by the drive sections. Each gear 703 has a tooth 722 thereon which, when the associated rack 40 is in an upper home position, as shown in Fig. 1, rests in contact with an adjacent drive portion of the key 720. However, when any rack 40 is set vertically in a position other than its home position, the tooth 722 on the associated gear 703 will be located out of contact with the key 720 and will be spaced therefrom by an angular amount depending upon the setting of the rack 40.

It will be recalled that upon the depression of the bar 13 and rearward movement of the link 673 thereby the stud 680 on the latter will move rearwardly along the slot 681 in the lever 682. During such movement the stud 680 will also move into a second shorter slot 750 in a cam follower 751 pivoted on the shaft 683. The follower 751 is provided with a roller 752 held against the periphery of a cam 753, keyed to the main shaft 8, by means of a spring 754. The latter is tensioned between the cam follower and a frame stud 755.

During the first part of a main clutch cycle initiated by depression of the bar 13, the cam 753 will become effective to rock the cam follower 751 and consequently the lever 682, whereupon the outer end of the latter will engage a stud 1755 on a rack 756, raising the latter. The rack 756 is provided with guide slots 757 and 758 guided over frame studs 759 and 760, respectively. The rack meshes with a gear 761 fastened on the shaft 716. Thus, the rack 756 will become effective to rotate the shaft 716, causing the key 720 thereon to pick up the various gears 703 by their respective teeth 722 and thus return the gears and their respective racks 40 and contact elements 654 to upper home positions shown in Fig. 1.

Previous to and during the above operation, the cams 705 and 706 (Fig. 6) will have become effective to retract the slide 697 rearward, permitting the roller 710 of the locking bail 707 to drop off cam formation 712, allowing spring 709 to position locking bail 707 out of engagement with the various racks 40 so that the latter may be adjusted vertically. Now, as the racks 40 reach their upper home positions, the cams 705 and 706 will move the slide 697 forwardly to its initial illustrated position, causing the cam formation 712 to again force the locking bail 707 into engagement with the various racks, thus holding the same in their home positions.

During the foregoing operation, the main racks 35 (Fig. 1) will have advanced forwardly to positions controlled by associated amount keys 43. Each of the main racks is provided with a rack gear section in continual mesh with an associated idler 775, the latter idlers being all rotatably and independently mounted on a stationary shaft 776. Each idler 775 is located in juxtaposition with an associated multiplicand rack 40.

The diametral pitch of the idlers 775 and the rack gear portions 40a of the racks 40 are the same, and the disposition of the gear teeth thereon is such that when these parts are in their illustrated home positions or in any other position, the teeth of both the pinions and the racks will be in lateral alignment. Therefore, as the machine continues through its cycle, the cams 705 and 706 will become effective to shift the slide 697 (Fig. 11) forwardly beyond its illustrated home position, causing the cam formation 712 to again move out from under the roller 710 on the rack lock bail so that the latter may again permit movement of the racks 40. Concurrently, the shoulder 696 on the slide will pick up the hook 692 of slide 694, thus rocking the cam plates 698 clockwise which, through the cam grooves 713, will lower the gear shaft 716 into an alternate dot-and-dash line position 716a (Fig. 1). During such movement, the various gears 703 on the shaft 716 will roll downwardly while in mesh with teeth 40a of the racks 40 and will thus move into mesh with the idlers 775, thereby forming an operative connection between the main racks 35 and the multiplicand racks 40.

The timing of the various cams operated by the main shaft 8 (as shown in Fig. 13) is such that the above mentioned operative connection or coupling between the main racks 35 and the multiplicand racks 40, as noted at 4 in Fig. 13, is effected before return of the main racks to their starting positions, as noted at 2 and such operative connection is maintained throughout the return of the racks 35 so that the racks 40 will be adjusted downwardly by amounts equal to the amount of return movement of their associated main racks 35.

After return of the main racks 35 to their home positions during which the multiplicand racks 40 have been advanced to positions representing the new multiplicand factor, the cams 705 and 706 become effective to actuate slide 697 to its illustrated initial position, thereby forcing the locking bail 707 into locking engagement with the racks 40, as noted at 1. At the same time, the slide 697 permits the spring 1677 (Figs. 2 and 10) to return the slide 694, rocking the cam plates 698 to their original illustrated positions and thus raising the shaft 716 to withdraw the various gears 703 from mesh with the idlers 775 so that the racks 35 may be employed for multiplication and other purposes without disturbing the setting of the multiplicand factor in the racks 40.

It will be seen in Fig. 13 that the locking bail 707 is unlocked twice in each cycle. During the first unlocked condition of the bail the multiplicand racks 40, see 3, are cleared.

Having thus described the invention, what we desire to secure by United States Letters Patent is:

1. In a calculating machine including a calculating unit and cyclically operable drive mechanism, the combination comprising denominationally arranged devices, each adjustable to different positions from a home position for entering different digits, respectively, of a factor into such calculating unit, means for locking said devices in different positions thereof, differentially operable actuators adapted to adjust said devices, each of said actuators being movable from and to a home position, selectively settable means for controlling the extent of movement of said actuators from said home positions, normally ineffective means for operatively connecting said actuators to said devices, an actuating element movable sequentially by said drive mechanism to each of three positions, said element being capable in one of such positions to cause said locking means to lock said devices and in a second position to cause said locking means to release said devices, and in a third position to cause said locking means to release said devices and to render said correcting means effective; means operable by said drive mechanism for moving said actuators from said home positions thereof and for moving said actuating element to said second position thereof and for moving said entering devices to said home positions thereof, and means operable by said drive mechanism for thereafter moving said actuating element to said third position and for returning said actuators to said home positions thereof whereby to advance said entering devices from said home positions thereof, and means operable by said drive mechanism for thereafter moving said actuating element to said first position thereof.

2. In a calculating machine including a calculating unit and cyclically operable drive mechanism, the combination comprising denominationally arranged devices, each adjustable to different positions from a home position for entering different digits, respectively, of a factor into said calculating unit, normally effective means for locking said devices in different positions thereof, differentially operable actuators adapted to adjust said devices, each of said actuators being movable from and to a home position, selectively settable means for controlling the extent of movement of said actuators from said home positions thereof, normally ineffective means for operatively connecting said actuators to said devices, an actuating element movable sequentially by said drive mechanism to either of two positions, said element being capable in a first one of said positions to cause said locking means to release said devices and in a second position to cause said locking means to release said devices and to render said connecting means effective; means operable by said drive mechanism for moving said actuators from said home positions thereof and for moving said actuating element to said first position thereof and for moving said entering devices to said home positions thereof, and means operable by said drive mechanism for thereafter moving said actuating element to said second position and for returning said actuators to said home positions thereof whereby to advance said entering devices from said home positions thereof.

RICHARD S. MARK.
FRED N. SCHWEND.
CLIFFORD P. STOWELL.

REFERENCES CITED

The following references are of record in the file of this patent:

UNITED STATES PATENTS

| Number | Name | Date |
|---|---|---|
| 1,991,806 | Kottmann | Feb. 19, 1935 |
| 2,467,441 | Noller et al. | Apr. 19, 1949 |